United States Patent
Nickerson et al.

(10) Patent No.: US 6,421,724 B1
(45) Date of Patent: Jul. 16, 2002

(54) WEB SITE RESPONSE MEASUREMENT TOOL

(75) Inventors: Rand B. Nickerson; Mark A. Treschl, both of Highland Park, IL (US); Kathryn L. Kidd, Montgomery Village, MD (US); Matthew J. Crofoot, Chicago, IL (US)

(73) Assignee: OpinionLab, Inc., Highland Park, IL (US)

( * ) Notice: Subject to any disclaimer, the term of this patent is extended or adjusted under 35 U.S.C. 154(b) by 0 days.

(21) Appl. No.: 09/385,256

(22) Filed: Aug. 30, 1999

(51) Int. Cl.[7] .............................................. C06F 13/00
(52) U.S. Cl. ...................................... 709/224; 709/219
(58) Field of Search .................................. 345/326, 348, 345/356, 745, 747, 751, 760, 971; 705/10; 709/202, 210, 213, 223, 224, 217, 219; 707/501

(56) References Cited

U.S. PATENT DOCUMENTS

| | | | |
|---|---|---|---|
| 5,537,618 A | * 7/1996 | Boulton et al. | 345/326 |
| 5,678,041 A | 10/1997 | Baker et al. | 709/9 |
| 5,706,507 A | 1/1998 | Schloss | 707/104.1 |
| 5,754,939 A | 5/1998 | Herz et al. | 455/3.04 |
| 5,761,683 A | 6/1998 | Logan et al. | 707/513 |
| 5,778,182 A | 7/1998 | Cathey et al. | 709/219 |
| 5,804,803 A | 9/1998 | Cragun et al. | 235/375 |
| 5,809,247 A | * 9/1998 | Richardson et al. | 709/218 |
| 5,862,223 A | 1/1999 | Walker et al. | 380/25 |
| 5,862,260 A | 1/1999 | Rhoads | 382/232 |
| 5,862,325 A | 1/1999 | Reed et al. | 708/201 |
| 5,870,744 A | 2/1999 | Sprague | 707/9 |
| 5,958,008 A | * 9/1999 | Pogrebisky et al. | 709/223 |
| 5,991,735 A | * 11/1999 | Gerace | 705/10 |
| 6,134,531 A | * 10/2000 | Trewitt et al. | 705/10 |
| 6,141,010 A | * 10/2000 | Hoyle | 345/356 |
| 6,161,112 A | * 12/2000 | Cragun et al. | 707/501 |
| 6,189,029 B1 | * 2/2001 | Fuerst | 709/217 |
| 6,260,064 B1 | * 7/2001 | Kurzrok | 709/224 |

OTHER PUBLICATIONS

Different Versions of the OnlineOpinion Data Collection Technique Dramatically Impact the Type of Response a Website Receives by OpinionLab, Inc., Nov. 1, 1999.*

BizRate.com, Independent Merchant Evaluation, https://eval.bizrate.com/popchoice.pl?id=19383&rb=1&ip=204.194.97.2&xsum=67748, 1 page, printed Jun. 13, 2000.

https://eval.bizrate.com/eval_t.pl?id=19383&ip=204.194.97.2&sum=67748&g=102, 5 pages, printed Jun. 13, 2000.

* cited by examiner

*Primary Examiner*—N. Le
*Assistant Examiner*—Walter Benson
(74) *Attorney, Agent, or Firm*—Baker Botts L.L.P.

(57) ABSTRACT

A web site response measurement tool is provided for collecting user reaction to a web site on a page-by-page basis and for providing online self-serve topographical linked reports displaying the collected data. Additional diagnostic information can be collected as well as user demographic information for assisting a web site owner in tailoring his/her web site to a specific audience.

9 Claims, 6 Drawing Sheets

FIG. 5

Make your web space a better place:

User Registration

By registering you will be able to provide more useful feedback to the sites that you visit. Once you complete the following information, a cookie will store an ID with your browser that will identify your unique demographics with the ratings you make on a given page.

You only need to complete the following information once and it will be associated with your ratings. You will use your password to update this information online.

Nickname: [ ]
Password: [ ]
E-mail Address: [ ]
Gender: [select gender ▼]
Age: [select age ▼]
Industry: [select industry ▼]
Employment Status: [select status ▼]

[Register]

Registration Tips

- Please specify a "valid" email address as we will send your password to this email address.
- When selecting your user name, please use only alphanumeric characters. No special characters are accepted, such as <space>, /, -, _, !,~, etc.
- Please do not select a user name that contains words that others may consider to be offensive; no swear words will be permitted.
- You can change your password at any time by selecting Edit Profile from the Help page.

Please read our Privacy Policy for information on how we protect user privacy.

Done | Internet zone

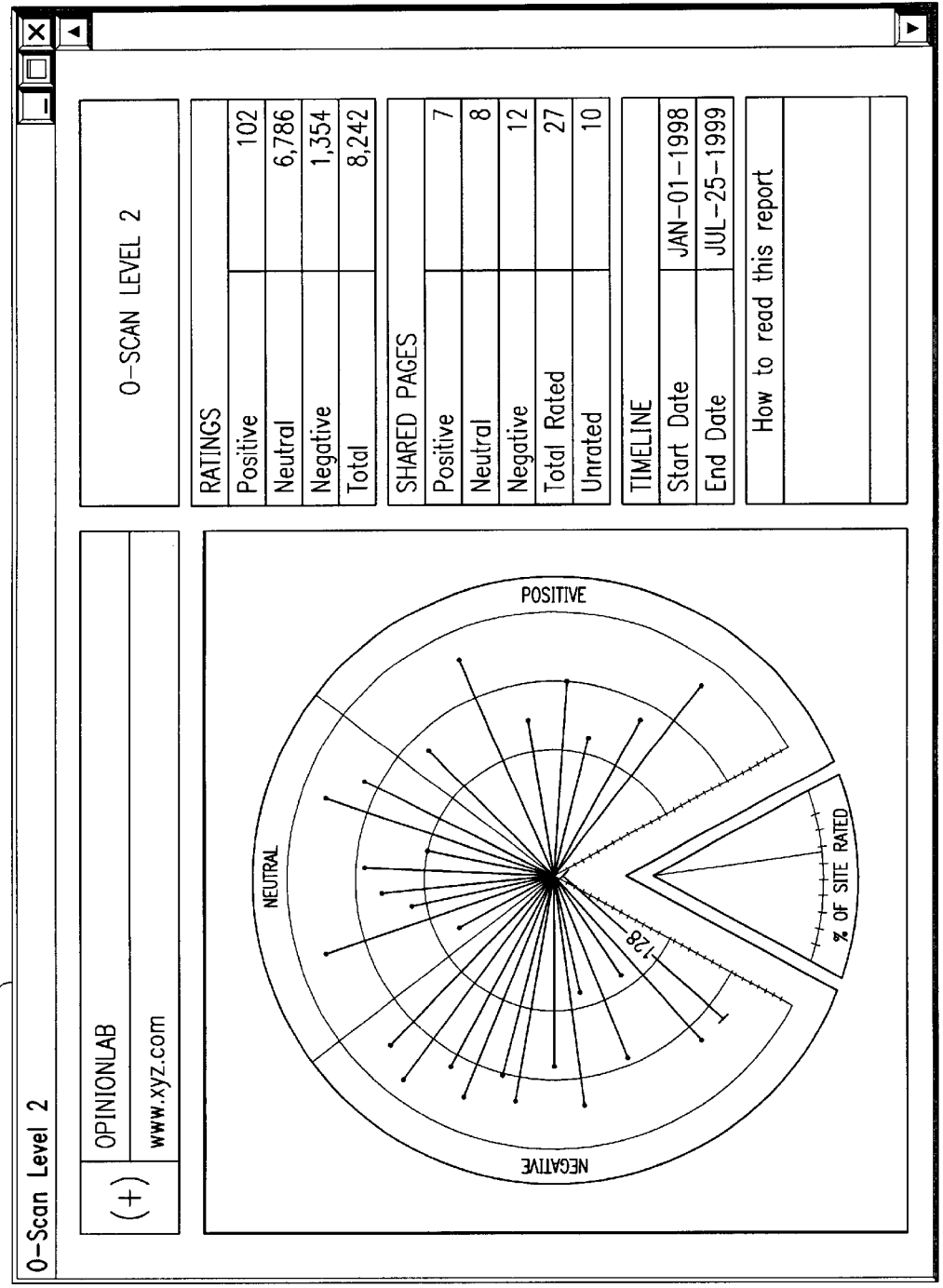

WEB SITE RESPONSE MEASUREMENT TOOL

FIELD OF THE INVENTION

The present invention relates to web site response measurement tools. More particularly, the present invention relates to tools for collecting and reporting user interaction with and response to a web site on a page-by-page basis.

BACKGROUND INFORMATION

As computer networking technology continues to advance, many companies are scrambling to take advantage of intranets, extranets and the Internet to provide Web sites containing information about their business, to conduct transactions, and to build relationships. The Internet in particular has become an exciting new electronic marketplace that companies are exploring. A typical web site comprises a plurality of individual web pages linked together in a predetermined topography. Each web page provides specific categorical information. A user navigates through the web site by "clicking" on links embedded on the individual Web pages. The web sites typically provide information about the company and its products and/or services and/or are used to conduct transactions, or present advertisements. Web sites can be visited by employees, customers, investors, business partners, prospects and many others.

Employees can be looking for guidance and support information about the company. Customers may be making decisions about whether to do business with a company based on the image presented by the company's web site or actually conducting business via the Internet. Investors may be assessing the company's ability to create value based on its web site. Business partners and prospects may be searching for companies that are a good fit for them based on information presented in Internet web sites.

In order to improve the effectiveness of the web as a media, it would be helpful to collect and evaluate user reaction to web sites on a page by page basis. Thus, there is a need for a web site measurement tool for measuring user reaction to web sites through feedback provided by users.

Unique, idiosyncratic, unpredictable and individualized methods of requesting user feedback do not provide the kind of consistent and reliable data needed to properly evaluate a web site. Nor do they result in a consistent, high level of response. Users will typically not employ a response method that they must learn, that requires them to leave the page of interest, that takes an unpredictable length of time or that requests information they are not prepared to divulge.

Furthermore, inconsistent methods of obtaining user feedback prevent web site owners from comparing user reaction across web sites. Capturing feedback data on a web site level, rather than web page level, leads to confusion for users giving feedback as well as for web site owners interpreting the feedback data because definition and context of the data is ambiguous. Thus, there is a need for a web site response measurement tool that captures user reaction feedback data on a page-by-page basis, using a consistent, fast, convenient and predictable method to allow the feedback data to be compared across web pages and web sites throughout the world wide web.

To further increase the value of the user reaction, it is also desirable to associate user demographic information with a user's reaction feedback data. In this manner, a web site owner can tailor a web site to target a specific market segment by customer demographic. In order to encourage users to provide demographic information, a method for collecting the data that does not require the user to download special collection software or submit their information more than once must be designed.

Once user reaction feedback data is collected, it needs to be organized and reported in a format that is easy to understand and analyze. It is important that the data be presented to the web site owner in a fashion that emphasizes the site topography so that valuable page level data is not obscured. This requires unique navigational tools.

As described above, there is a need for a web site measurement tool that collects user reaction data on a page-by-page basis. Preferably, user demographic data is collected and reported with the user reaction data. The collected data must be reported in an easy-to-understand and analyze format on a page-by-page basis that emphasizes the web site's topography. Unique online self-serve navigational system linking user feedback to specific site pages and topography would facilitate the owner's interpretation and understanding of the user feedback data.

SUMMARY OF THE INVENTION

These needs and others are satisfied by the web site response measurement tool of the present invention. A web site response measurement tool according to the present invention comprises a user reaction feedback mechanism, means for consistently collecting user response data, means for organizing user response data on a page-by-page basis and means for reporting the user response data on a page-by-page basis and at an aggregate level through a unique online self-serve navigation system linking user feedback to site topography. The present invention also provides a means to collect demographic data for a user and associate it to that user.

The user reaction feedback mechanism is located on one or more web pages on a typical site. This allows a user to rate each page independently. The user reaction feedback mechanism provides a language-independent 5-point rating scale for rating each of the web pages. The user reaction feedback mechanism can further include a user diagnostic feedback mechanism that provides a series of questions designed to obtain user response on a plurality of aspects of each of the web pages. The questions can relate to the user's reaction to the content, design and usability of each web page.

Preferably, the user reaction feedback mechanism further comprises an icon placed in a specific viewable location on each web page relative to the web browser border. The icon is configured to remain in the viewable location relative to the browser border even as the user scrolls through the web page. The user feedback mechanism is easy-to-use, fact, predictable and consistent across pages and across sites to encourage usage. It may also be placed in the "masthead" area of a site and, thus, viewable from every page.

The web site response measurement tool can further include a user registration system for collecting user demographics information. The means for organizing the data associates the collected user demographics information with the user response data and the means for reporting associates the user demographics information with the user response data.

A self-serve online report is generated by the means for reporting. The report allows web site owners to navigate through their web site following the linked topography of the web site to view the user response data. The report provides a plurality of display pages for displaying the user response data on a page-by-page basis with each of the display pages comprising user response data for a corresponding web page along with links to each of the pages linked from this page.

The means for organizing the data further includes means for quantifying the user reaction data into a standardized measure.

BRIEF DESCRIPTION OF THE DRAWINGS

FIG. 5 is a screen capture of a user demographic information entry screen according to the present invention; and FIG. 6 is a screen capture of a computer screen showing a topographical linked report according to the present invention.

DETAILED DESCRIPTION OF THE PREFERRED EMBODIMENT

Figure 1:
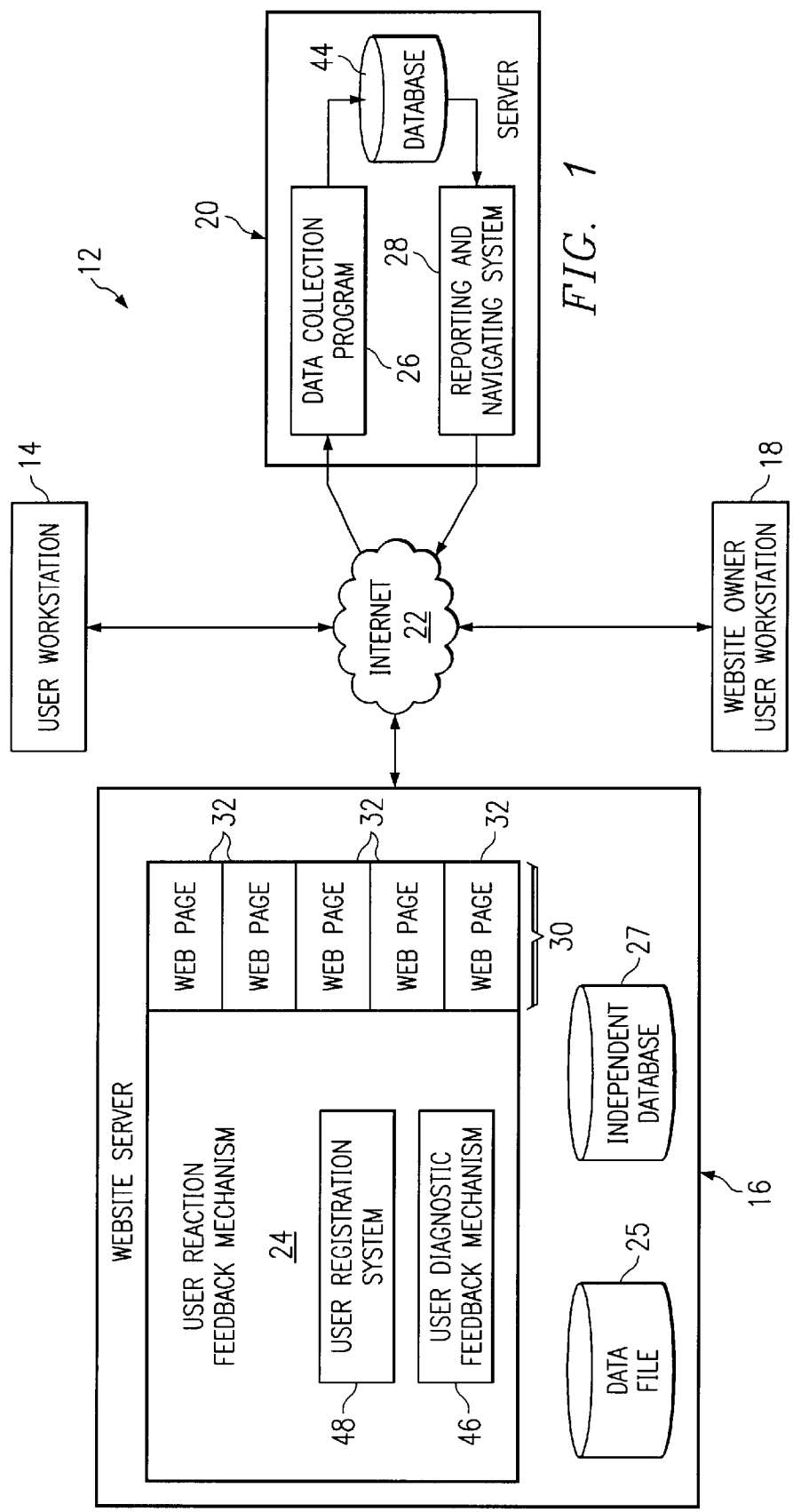
FIG. 1 is a schematic block diagram of a computer network employing a web site measurement tool according to the present invention.
Figure 2:
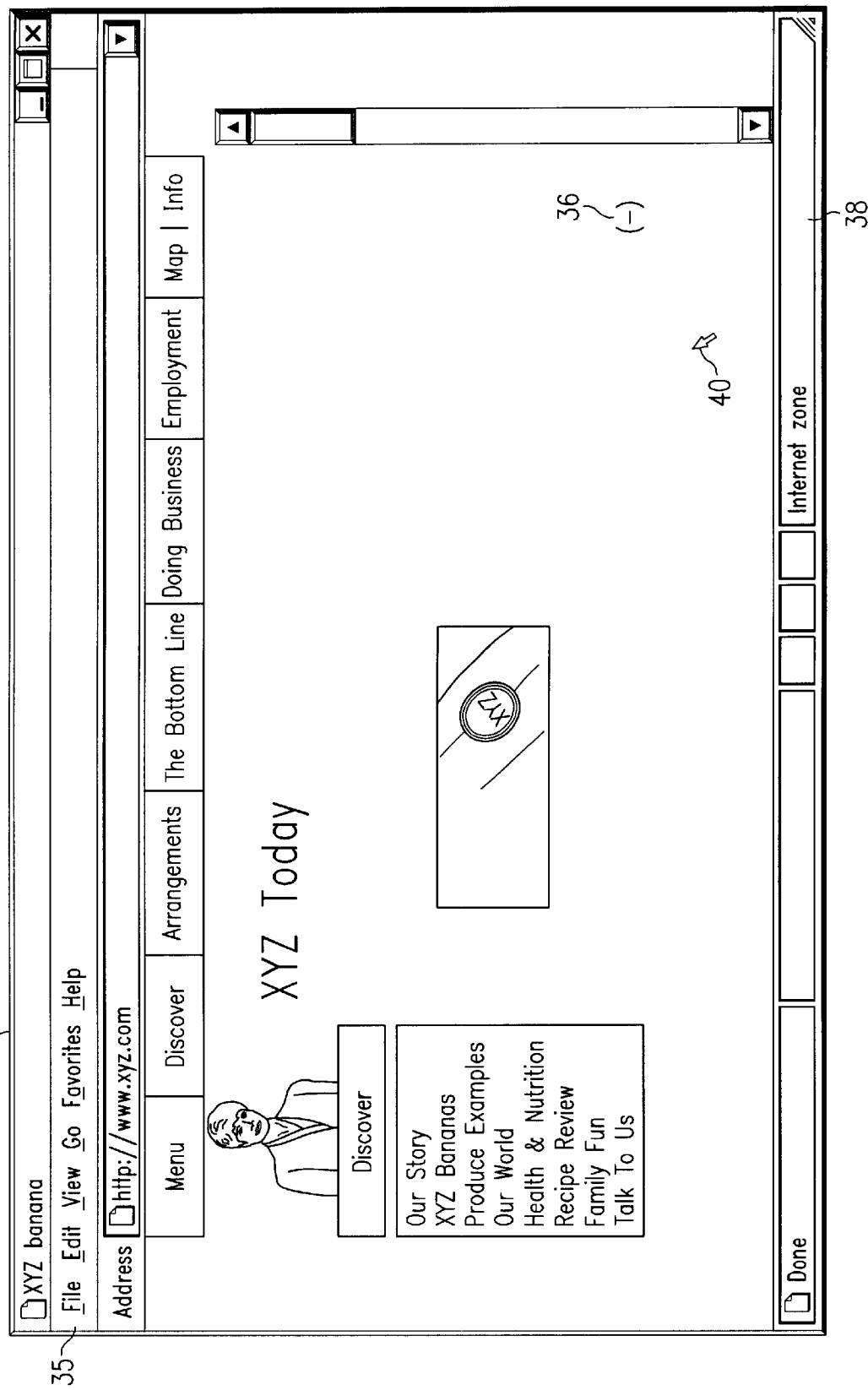
FIG. 2 is a screen capture of a computer screen displaying a web page including an icon representing the web site measurement tool of FIG. 1.
Figure 3:
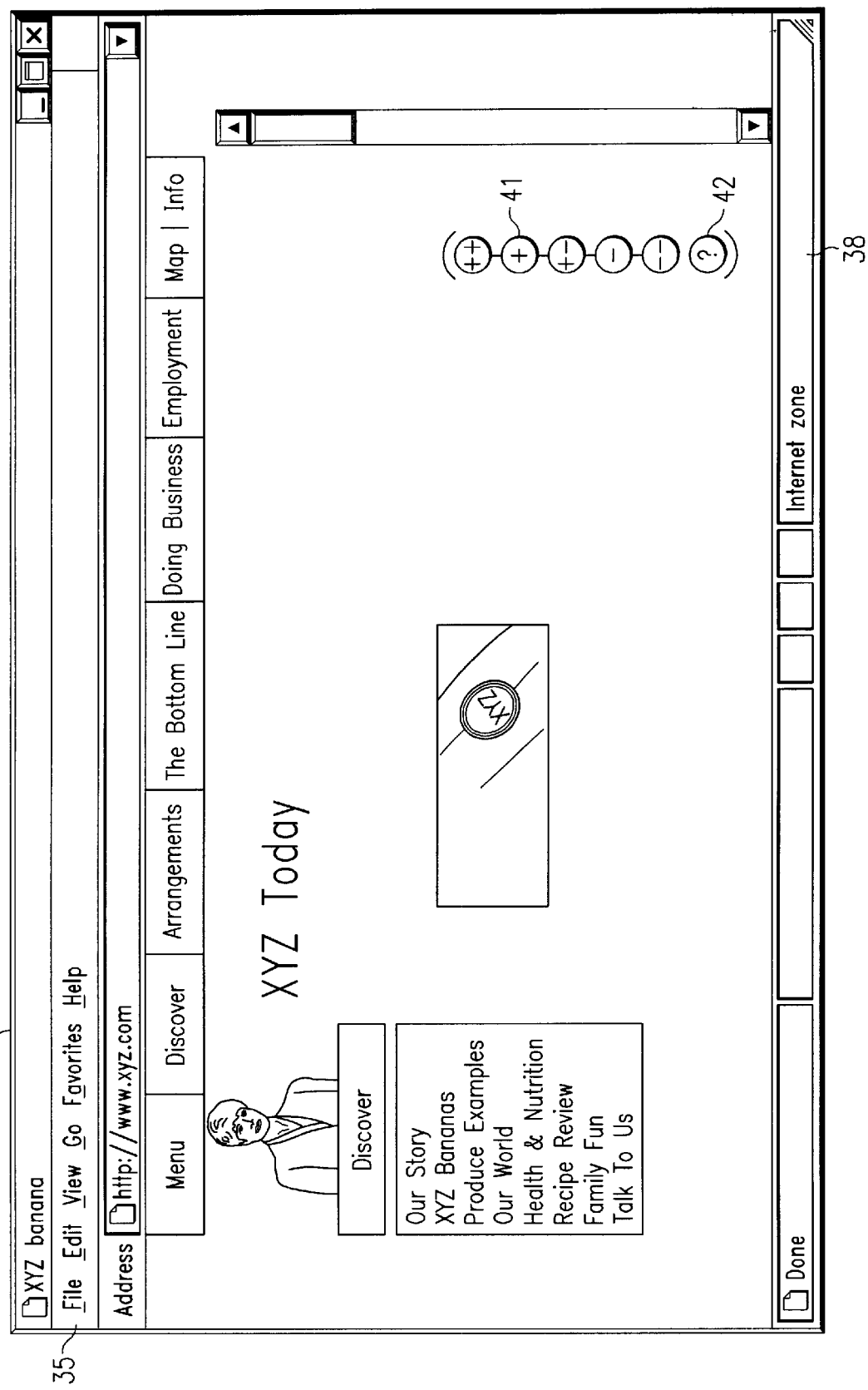
FIG. 3 is a screen capture of a computer screen displaying a web page including the icon-based user reaction feedback mechanism of FIG. 2 showing a five-point rating scale.
Figure 4:
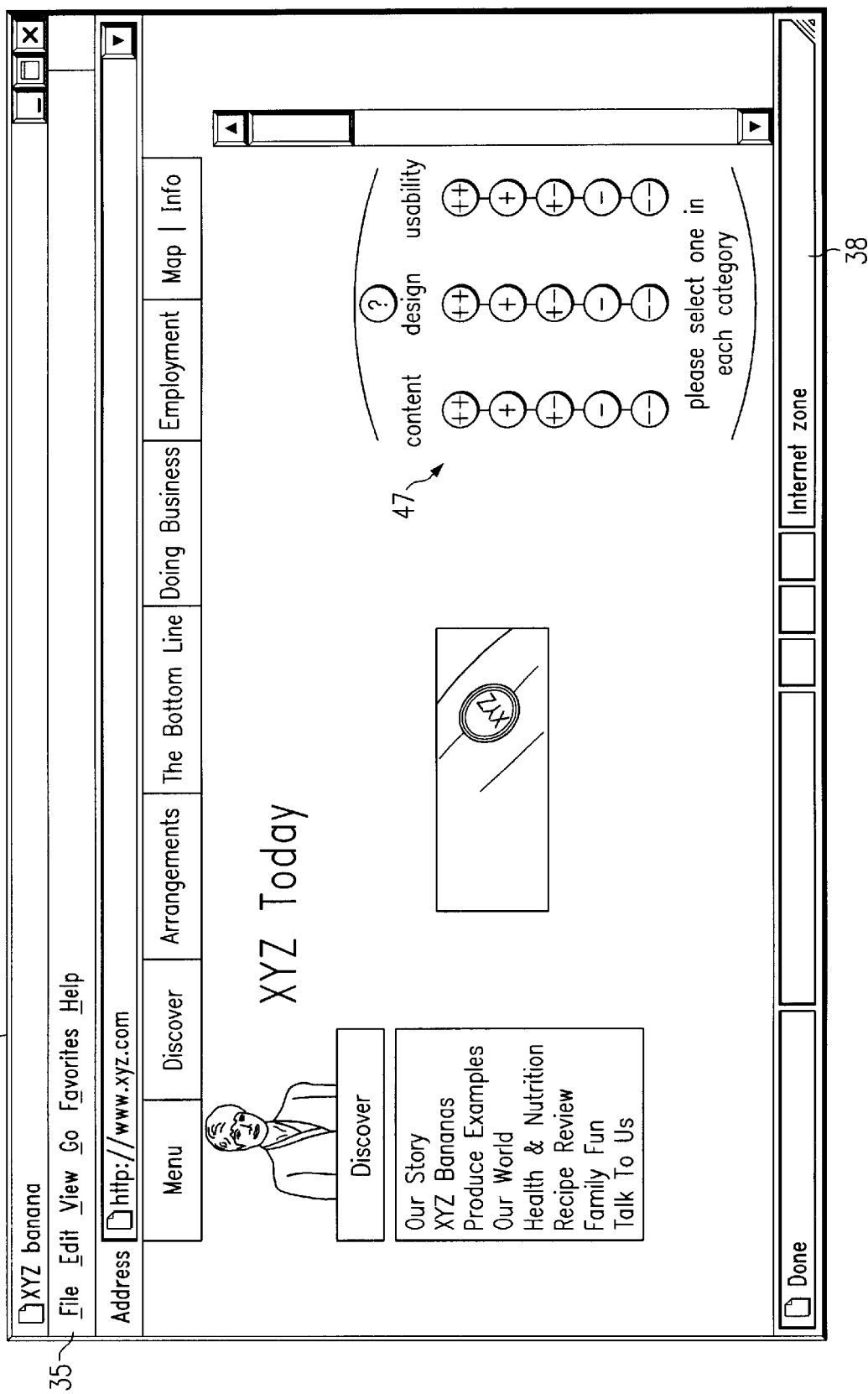
FIG. 4 is a screen capture of a computer screen displaying a web page including an alternate user reaction feedback mechanism of FIG. 2 showing a series of three five-point rating scales.

In accordance with the present invention, a user response measurement tool is described that provides distinct advantages when compared to those of the prior art. The invention can best be understood with reference to the accompanying drawing figures.

Referring now to the Figures, a web site response measurement tool according to the present invention is generally designated by reference numeral 10. The web site response measurement tool 10 is configured to operate on web pages in a computer network 12, such as an intranet, extranet or the Internet.

In a preferred embodiment, a web site response measurement tool 10 according to the present invention operates to measure user reaction to an Internet web site on a page-by-page basis. In this embodiment, the computer network 12 comprises a user workstation 14, a web site server 16, a web site owner user workstation 18 and a data collection and reporting server 20 all connected via the Internet 22.

The web site measurement tool 10 comprises a user reaction feedback mechanism 24, a data collection program 26 and a system for reporting and navigating the collected data 28. The user reaction feedback mechanism 24 resides on the web site server 16 until a user requests the page. At this point the user reaction feedback mechanism is downloaded onto the user workstation 14 and is embedded in the user's browser. The data collection program 26 and system for reporting the collected data 28 reside on the data collection and reporting server 20.

The user reaction feedback mechanism 24 is incorporated into certain web pages 32 residing on the web site server 16. For example, the user reaction feedback mechanism 24 comprises a client side script that is activated every time a web page 32 from the web site 30 is accessed. In the preferred embodiment, the user reaction feedback mechanism 24 comprises a Java®-script computer program configured to run on the user workstation 14 when a user accesses a web page 32.

A user accesses a web page 32 residing on the web site server 16 from the user workstation 14 via the Internet 22 using an Internet browser 34. Typically, only a portion of the web page 32 is viewable in the browser 34 window at a time. A user can scroll through the web page 32 changing the viewable portion.

In a preferred embodiment, the user reaction feedback mechanism 24 appears as an icon 36 in a predetermined location relative to the browser window border 38 on the viewable portion of the web page 32. The icon 36 is configured to remain in the predetermined location as the user scrolls through the web page 32. Alternatively, the icon 36 can be located in the masthead 35 area.

As the user moves the mouse pointer 40 over the icon 36, the icon 36 changes into a five-point scale 41 and question mark 42. The user can rate his/her reaction to the web page 32 by selecting a rating from the five point scale 41. The rating is selected by moving the mouse pointer 40 over the desired rating and clicking the mouse button (not shown). Selecting the question mark 42 provides the user with detailed instruction on how to use the measurement tool 10.

Upon selection of a rating by a user, the user reaction feedback mechanism 24 stores the following information in a data file 25 on the data collection and reporting server 20:
  page identification code;
  Internet protocol address;
  rating value (++, +, +/−, −, −−);
  rating time and date;
  time spent on page before rating it;
  ID associated with the person rating the page (and desirably associated demographics); and
  session ID.

In this manner, user reaction data to a web site 30 can be collected on a page-by-page basis providing definition and context to the data.

The user reaction feedback mechanism 24 can also include a user diagnostic feedback mechanism 46. This icon 36 is similar but can be discriminated through color or other means from the single scale 41 measurement icon to maintain predictability and consistency from a user perspective. The user diagnostic feedback mechanism 46 is configured to present a series of three scales 47 to the user designed to obtain the user's reaction to various specific aspects of the web page 32 such as content, design and usability of the web page.

In this instance, the icon 36 is configured to open to reveal three scales 47 of 5 points each similar to the previous single scale 41. The scales 47 are labeled "Content," "Usability" and "Design." The scales 47 are configured to rotate in position each time they are opened to eliminate response bias.

The user's responses to each of the questions presented by the user diagnostic feedback mechanism 46, along with the information specified above, is also stored in the database 25 on the web site server 16.

As with the user reaction feedback mechanism 24, the user diagnostic feedback mechanism 46 collects user responses on a page-by-page basis. In this manner, the web site owner can use the data collected by the user diagnostic feedback mechanism 46 to identify specific aspects of a web page 32 that can be improved.

Additionally, a user registration system 48 can be included in the user reaction feedback mechanism 24 for collecting user demographic information. In a preferred embodiment, the user registration system 48 is implemented as a web page registration page 50. As shown in FIG. 5, the web registration page 50 collects the following user information:

Nickname:
Email address (optional);
Password;
Gender;
Age (in ranges 10 or less, 11–17, 18–24, etc.);
Industry of user;
Employment (full-time, part-time, student, retired, etc.).

Additionally, the registration page 50 can collect the following information:

Size of household (1, 2, 3, 4, 4+);
Highest level of education;
Household income range;
Country of residence.

The registration page 50 includes entry fields 52 into which the user is prompted to enter the above demographic information. This demographic information can be used by the web site owner to tailor their page revisions to appeal to a certain segment of users.

User demographic information is stored in an independent database 27. Each user is assigned a unique ID, preferably stored as a cookie on the user's workstation 14, which is associated with their demographic profile. On subsequent use of the icon 36 by a registered user, the icon 36 may confirm that it recognizes the user by displaying their nickname and the word "thanks."

The web site response measurement tool 10 of the present invention is configured to allow a web site owner to request reports showing user reaction to his/her web site 30 on a page-by-page basis. The web site owner requests a report by logging into the data collection and reporting server 20 via the Internet 22 from the web site owner's user workstation 18.

When attempting to download the rating software onto a web site, the web site owner is prompted by the data collection and reporting server 20 to enter the following information: First Name, Last Name, Title, Company, Address, Email Address, Phone Number, Industry, and web site address. The data collection and reporting server 20 also sends a notification that the web site owner's web site 30 will be crawled and a copy of a License Agreement regarding the providing of a report to the web site owner.

Upon receiving the requested information from the web site owner, the data collection and reporting server 20 verifies the user ID and password by Email via the Internet 22. The data collection and reporting server 20 conducts a web crawl to identify all of the web pages associated with this web site 30. This crawl is repeated at a predetermined frequency, and may also be triggered by receiving data about a web page 32. This information and site map are collected and organized by the data collection program 26 and stored in a data base 44 on the data collection and reporting workstation 20.

All user reaction and demographic data and client registration data is stored in the databases 25, 27 and 44. Submittal of this information is via an SSL secure server. All reports are generated on the fly from the databases 25, 27 and 44 by the data reporting system 28 on the data collection and reporting server 20. The web site owner can access the data collection and reporting server 20 to view the graphical report 54 by using their user ID and password assigned.

There are three possible ways to navigate to user response data for a specific page: 1) via a scan report categorizing average page ratings by color, value of the rating and number of ratings on a single graph; 2) by a list of pages; and 3) from the web page. FIG. 6 illustrates a preferred scan report.

In a preferred embodiment, the data collection and reporting server 20 is configured to provide an initial summary report including the user reaction data on a five-point scale on a page-by-page basis for free. The web site server 20 is also configured to offer more detailed diagnostic reports including information collected by the user diagnostic feedback mechanism 46 and user demographic information collected by the user registration system 48 for a fee. Payment can be accepted by prepaid accounts, credit card submissions, telefaxed invoice or other means.

It will be apparent to those skilled in the art that modifications may be made without departing from the spirit and scope of the invention. Accordingly, it is not intended that the invention be limited except as may be necessary in view of the appended claims.

What is claimed is:

1. A system for measuring subjective user reaction concerning a particular web page of a website, comprising:

a first icon viewable on the particular web page independent of input from a user subsequent to the user accessing the particular web page, the first icon soliciting a subjective user reaction to the particular web page as a whole from the user independent of input from the user subsequent to the user accessing the particular web page, the first icon operable to receive user input indicating a desire to provide a subjective user reaction to the particular web page as a whole, the user input causing a second icon to become viewable on the particular web page, the second icon comprising a plurality of multi-level rating scales for rating the particular web page, each multi-level rating scale being associated with a particular characteristic of the particular web page including at least one positive rating, a neutral rating, and at least one negative rating; and software associated with the second icon and operable to receive the subjective user reaction to the particular web page as a whole for reporting to a website owner.

2. The system of claim 1, wherein each characteristic of the particular web page is selected from the group consisting of content, design, and usability.

3. A system for measuring subjective user reaction concerning a particular web page of a website, comprising:

a first icon viewable on the particular web page independent of input from a user subsequent to the user accessing the particular web page, the first icon soliciting a subjective user reaction to the particular web page as a whole from the user independent of input from the user subsequent to the user accessing the particular web page, the first icon comprising a symbol selected from the group consisting of a plus sign, a minus sign, and a dynamic symbol that changes periodically from a plus sign to a minus sign and vice versa, the first icon operable to receive user input indicating a desire to provide a subjective user reaction to the particular web page as a whole, the user input causing a second icon to become viewable on the particular web page, the second icon providing the user an opportunity to provide a subjective user reaction to the particular web page as a whole; and software associated with the second icon and operable to receive the subjective user reaction to the particular web page as a whole for reporting to a website owner.

4. A system for measuring subjective user reactions concerning a plurality of particular web pages of a website, comprising:

a first icon viewable on each particular web page independent of input from a user subsequent to the user accessing the particular web page, the first viewable icon indicating to each user that has accessed the particular web page an opportunity to provide a subjective user reaction to the particular web page as a whole, the first viewable icon operable to receive user input indicating a desire to provide a subjective user reaction to the particular web page as a whole, the user input causing a second icon to become viewable on the particular web page;

the second viewable icon, operable to solicit a subjective user reaction to the particular web page as a whole from each user that has accessed the particular web page and provided user input via the first icon indicating a desire to provide a subjective user reaction to the particular web page as a whole, the second icon being substantially similar for each particular web page, the second icon comprising a multi-level rating scale for rating the particular web page, the multi-level rating scale including at least one positive rating, a neutral rating, and at least one negative rating; and software that is associated with the first and second icons and incorporated into the software for each particular web page such that the user need not download software separate from the particular web page to provide the subjective user reaction to the particular web page, the software associated with the first and second icons operable to receive the subjective user reactions to the particular web pages for reporting to a website owner.

5. A method of measuring a subjective user reaction concerning a particular web page of a website, comprising:

using a first icon viewable on the particular web page independent of input from a user subsequent to the user accessing the particular web page to solicit a subjective user reaction to the particular web page as a whole from the user independent of input from the user subsequent to the user accessing the particular web page, the first icon operable to receive user input indicating a desire to provide a subjective user reaction to the particular web page as a whole;

causing a second icon to become viewable on the particular web page in response to receiving the user input indicating a desire to provide a subjective user reaction to the particular web page as a whole, the second icon comprising a plurality of multi-level rating scales for rating the particular web page, each multi-level rating scale being associated with a particular characteristic of the particular web page including at least one positive rating, a neutral rating, and at least one negative rating; and using software associated with the second icon to receive the subjective user reaction to the particular web page as a whole for reporting to a website owner.

6. The method of claim 5, wherein each characteristic of the particular web page is selected from the group consisting of content, design, and usability.

7. A method of measuring a subjective user reaction concerning a particular web page of a website, comprising:

using a first icon viewable on the particular web page independent of input from a user subsequent to the user accessing the particular web page to solicit a subjective user reaction to the particular web page as a whole from the user independent of input from the user subsequent to the user accessing the particular web page, the first icon comprising a symbol selected from the group consisting of a plus sign, a minus sign, and a dynamic symbol that changes periodically from a plus sign to a minus sign and vice versa, the first icon operable to receive user input indicating a desire to provide a subjective user reaction to the particular web page as a whole;

causing a second icon to become viewable on the particular web page in response to receiving user input indicating a desire to provide a subjective user reaction to the particular web page as a whole, the second icon providing the user an opportunity to provide a subjective user reaction to the particular web page as a whole; and using software associated with the second icon to receive the subjective user reaction to the particular web page as a whole for reporting to a website owner.

8. A system for measuring a subjective user reaction concerning a particular web page of a website, comprising:

a first icon viewable on the particular web page independent of input from a user subsequent to the user accessing the particular web page, the first icon soliciting a subjective user reaction to the particular web page as a whole from the user independent of input from the user subsequent to the user accessing the particular web page, the first icon operable to receive user input indicating a desire to provide a subjective user reaction to the particular web page as a whole, the user input causing a second icon to become viewable on the particular web page, the second icon comprising a multi-level rating scale for rating the particular web page as a whole, the multi-level rating scale including at least one positive rating, a neutral rating, and at least one negative rating; and software associated with the second icon and operable to receive the subjective user reaction to the particular web page as a whole for reporting to a website owner.

9. A method of measuring a subjective user reaction concerning a particular web page of a website, comprising:

using a first icon viewable on the particular web page independent of input from a user subsequent to the user accessing the particular web page to solicit a subjective user reaction to the particular web page as a whole from the user independent of input from the user subsequent to the user accessing the particular web page, the first icon operable to receive user input indicating a desire to provide a subjective user reaction to the particular web page as a whole;

causing a second icon to become viewable on the particular web page in response to receiving the user input indicating a desire to provide a subjective user reaction to the particular web page as a whole, the second icon comprising a multi-level rating scale for rating the particular web page as a whole, the multi-level rating scale including at least one positive rating, a neutral rating, and at least one negative rating; and using software associated with the second icon to receive the subjective user reaction to the particular web page as a whole for reporting to a website owner.

\* \* \* \* \*

UNITED STATES PATENT AND TRADEMARK OFFICE
CERTIFICATE OF CORRECTION

| | |
|---|---|
| PATENT NO. | : 6,421,724 B1 |
| DATED | : July 16, 2002 |
| INVENTOR(S) | : Rand B. Nickerson et al. |

It is certified that error appears in the above-identified patent and that said Letters Patent is hereby corrected as shown below:

<u>Title page,</u>
Item [54], Title, change "WEB SITE RESPONSE MEASUREMENT TOOL" to -- SYSTEM AND METHOD FOR MEASURING USER REACTIONS CONCERNING ONE OR MORE PARTICULAR WEB PAGES OF A WEBSITE --.

Signed and Sealed this

Twenty-fifth Day of February, 2003

JAMES E. ROGAN
*Director of the United States Patent and Trademark Office*